United States Patent
Satongar et al.

(10) Patent No.: US 12,079,542 B2
(45) Date of Patent: *Sep. 3, 2024

(54) AUGMENTING CONTROL SOUND WITH SPATIAL AUDIO CUES

(71) Applicant: Apple Inc., Cupertino, CA (US)

(72) Inventors: Darius A. Satongar, Santa Clara, CA (US); Per Haakan Linus Persson, Cupertino, CA (US); Hugo D. Verweij, San Francisco, CA (US); Stuart J. Wood, San Francisco, CA (US); Andrew E. Greenwood, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,087

(22) Filed: Feb. 13, 2023

(65) Prior Publication Data

US 2023/0195412 A1 Jun. 22, 2023

Related U.S. Application Data

(63) Continuation of application No. 16/855,878, filed on Apr. 22, 2020, now Pat. No. 11,625,222.

(60) Provisional application No. 62/844,636, filed on May 7, 2019.

(51) Int. Cl.
*H04R 5/02* (2006.01)
*G06F 3/16* (2006.01)
*H04R 1/10* (2006.01)
*H04R 5/033* (2006.01)
*H04R 5/04* (2006.01)

(52) U.S. Cl.
CPC .............. *G06F 3/167* (2013.01); *G06F 3/162* (2013.01); *H04R 1/1041* (2013.01); *H04R 5/033* (2013.01); *H04R 5/04* (2013.01)

(58) Field of Classification Search
CPC . G06F 1/1694; G06F 3/03547; H04R 1/1041; H04R 5/033; H04S 7/304; H04S 2420/01
USPC ................................ 381/303, 307, 309–310
See application file for complete search history.

(56) References Cited

U.S. PATENT DOCUMENTS

| | | | |
|---|---|---|---|
| 11,625,222 B2 | 4/2023 | Satongar et al. | |
| 2006/0083394 A1 | 4/2006 | McGrath | |
| 2011/0106825 A1* | 5/2011 | Xiang | G06F 3/167 |
| | | | 707/E17.07 |
| 2012/0268563 A1* | 10/2012 | Chou | G01S 15/86 |
| | | | 381/310 |
| 2013/0236040 A1 | 9/2013 | Crawford et al. | |

(Continued)

FOREIGN PATENT DOCUMENTS

CN 108616789 A 10/2018

OTHER PUBLICATIONS 202010374387.2, "Chinese Search Report", mailed Apr. 23, 2024, 4 pages.

*Primary Examiner* — George C Monikang
(74) *Attorney, Agent, or Firm* — Aikin & Gallant, LLP

(57) ABSTRACT

A headset can include left and right ear-worn speakers and a control. In response to a control input of the control, the ear-worn speakers can be driven with driver signals that include a control sound having a virtual location determined by spatial auditory cues. The control sound can indicate a behavior of the control as a result of the control input. Other aspects are also described and claimed.

20 Claims, 5 Drawing Sheets

(56) References Cited

U.S. PATENT DOCUMENTS

| | | | |
|---|---|---|---|
| 2015/0078558 A1* | 3/2015 | Thandri | H04R 1/1041 |
| | | | 381/59 |
| 2015/0304790 A1 | 10/2015 | Yamashita | |
| 2016/0080868 A1* | 3/2016 | Hensen | H04R 5/04 |
| | | | 381/311 |
| 2017/0257723 A1 | 9/2017 | Morishita et al. | |

* cited by examiner

AUGMENTING CONTROL SOUND WITH SPATIAL AUDIO CUES

FIELD

One aspect of the disclosure herein relates to augmenting a control sound with spatial audio cues. Other aspects are also described.

BACKGROUND

Physical controls (e.g., buttons, switches, rotary knobs, sliders) are used in consumer devices such as headsets, mobile phones and tablet computers. Responses to input from the physical controls can vary. For example, controls can also be used to receive user inputs to navigate through various menus or other user interface objects. A button can change the on/off state of a device, or mute an output of a speaker. A rotary knob can change a loudness of a speaker output. A slider can dim a screen.

Spatial audio techniques allow for the perception of external sound sources by using headphones to control the sound pressure at the ears of the listener.

SUMMARY

Sounds created by controls can provide useful feedback to a user that the user's input has been properly administered. This feedback can improve the overall user experience of a device. Controlling these sounds, however, can be difficult due to construction restraints of a control and the interaction of the control with other components. In some cases, when a physical sound is not audible due to the construction of the control (e.g., a touch control or other quiet control), a device can generate a control sound through speakers to provide audible feedback to a user. In some cases, where the control does make a physical sound on a head-worn device, the sound can be muffled because the ears are covered (e.g., in the case of ear-phones). Sounds produced by physical controls can interact with other components of the device (e.g., a housing, or other members of the device) and can be unpredictable. The sounds can travel from the control through the air, and/or through various mechanical members of the device before reaching the user's ears.

Physical controls like buttons, switches, dials, sliders, can be actuated by finger. When considering the physical controls used on a head-worn device, e.g., an over-ear (circum-aural) headset, when a control is actuated, sound from the control can passively propagate from the control to the ear due to the short distance between the control and the ear and/or mechanical coupling. In such a case, the control sound can be clearly audible and unpleasant due to occlusion effect of having a sealed headphone. Speakers of the headset, however, can be used to play binaural audio cues to mask or augment the sound of the control to provide direct control sound feedback. The control sound played by the headset can be more pleasant than the passive sound generated by the physical control, because the control sound will not sound occluded.

When a button is a silent touch-sensitive button, generating a control sound at a virtual location perceived to indicate a physical location of the touch-sensitive button can provide feedback to a user that the user's input through the control has been sensed and will be processed.

Control sounds can be spatially rendered to mimic or augment physical sounds made by buttons for a device (e.g., a head-worn device). The close interaction between a user pressing the button and the spatial audio cues matching that button's location can reinforce that a device-generated virtual control sound is associated with the control. A virtual location of the control sound created by the spatial audio cues can vary, based on a physical location of a corresponding physical control. Some controls, such as sliders and dials (rotary controls) can provide a continuum of input (e.g., up/down, louder/quieter, etc.). Virtual control sounds can be generated to model such a continuum, for example, by moving the location of the virtual control sound from one location to another, closer and farther, in a perceived rotational direction, etc.).

In one aspect, a method for providing audio feedback relating to a control, includes: receiving a control input of the control; in response to a control input, driving ear-worn speakers with driver signals that include a control sound having a virtual location (e.g., based on spatial audio cues). The control sound can indicate a behavior of the control (e.g., a press, a movement, a directional movement, or a control state), the behavior resulting from the control input. A user that actuates the control can hear the control sound played through the ear-worn speakers and connect a) the control sound and b) the virtual location of the control sound, with the user's actuation of the control. This feedback can improve the overall user experience.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the disclosure is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Spatialized Control Sound

Figure 1:
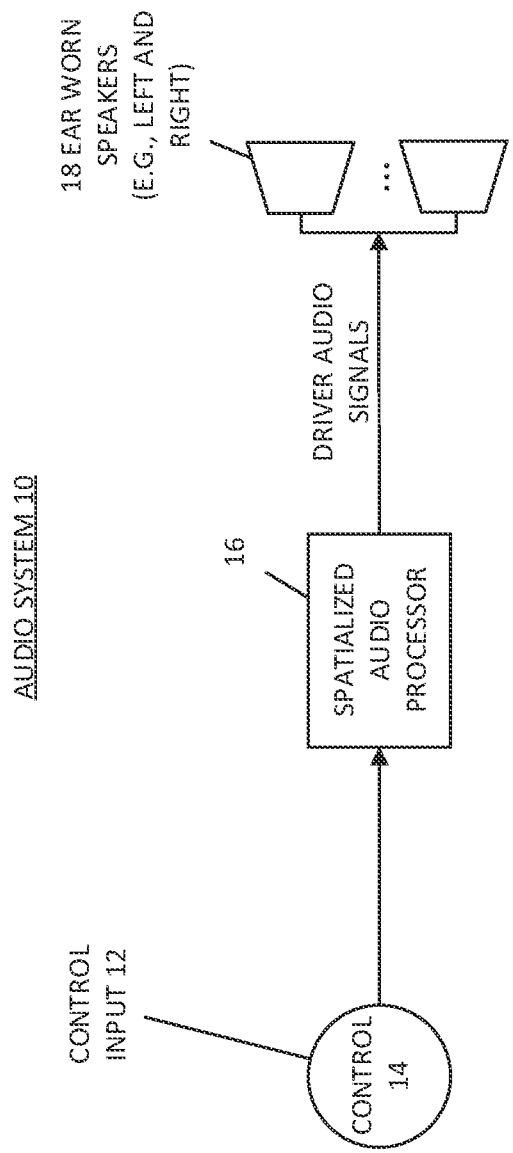
FIGS. 1-3 illustrate an audio system or device that produces driver audio signals having spatialized control sound, according to different aspects.

Referring now to FIG. 1, an audio system or device 10 is shown, relating to generating a spatialized control sound in response to a control input 12. In one aspect, the audio system 10 can be a head-worn device, for example, head-worn speakers that can be over the ear (circumaural), in the ear, or on the ear. Spatializing sounds through ear-worn speakers allows for greater control of spatialization, as compared to loudspeakers, because ear-worn speakers deliver spatial cues directly to a listener's ears.

Control 14, which can be a physical control or a control rendered on a display, can be located on the head-worn device, or off of the device, e.g., on a laptop computer, a desktop computer, a mobile phone, a smart phone, a tablet computer, a smart speaker, home audio system, any consumer electronics device with audio capability, and a system in a vehicle (for example, an infotainment system for an automobile). The control can be a finger-actuated control, such as a dial-knob, a button, a switch, a slider, a touch-sensitive control, or a graphical user interface control (e.g., located on a touch display).

A control input 12, such as a push or touch of a button, can be generated through a control 14. In response to the control input, a spatial audio processor 16 can generate driver audio signals that include a control sound having a virtual location. The virtual location can be generated based on one or more spatial auditory cues; e.g. interaural time difference (ILD), interaural level difference (ILD), head related transfer function (HRTF), spectral cues, monaural cues, and dynamic binaural cues. These cues of the control sound can be perceived by the listener as a virtual location of the control sound, based on how humans process and localize sound. The processor can drive ear-worn speakers 18 with driver signals (e.g., a left and a right driver signal).

The control sound, which can be any type of sound, can indicate a behavior of the control as a result of the control input. For example, the control sound can be a 'click' noise, a sweep sound, words spoken in language, etc. This can provide feedback to the user that the user's control input (e.g., a press of a button) has been received. In the case where the control is mechanically coupled to the head-worn device, the spatial playback of the control sound can augment the physical sound caused by the control that would otherwise create a negative user experience due to the occluded sound.

Pre-Generated Control Sounds

Figure 2:
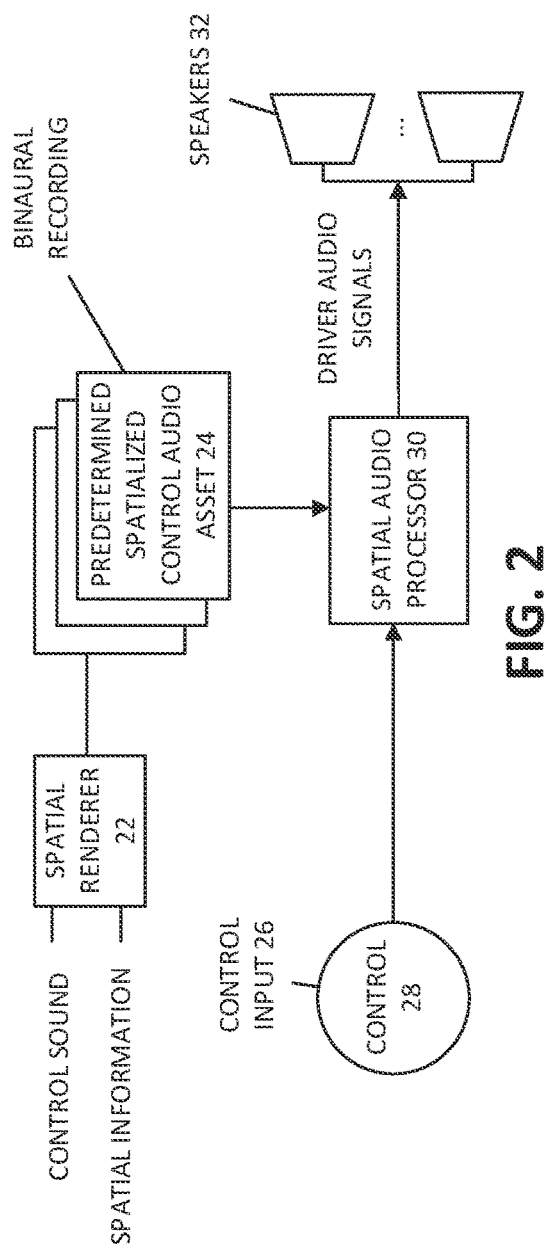

In one aspect, as shown in FIG. 2, the spatial audio processor 30 generates the driver signals in response to a control input 26 based on a predetermined spatialized control audio asset 24, the predetermined assets being generated at a time prior to the control input. The predetermined assets can be synthesized sounds, pre-generated with spatial renderer 22 that spatializes a control sound and spatial information (e.g., a virtual location of the control) and encodes the data as sound files with spatial cues embedded. Additionally or alternatively, the audio assets can be generated through binaural recordings of the control sounds, thereby embedding into the assets, spatial information of the control sounds in the recording environment. These are just examples of how the control sounds can spatialized and stored as assets prior to the actuation of the control. A library of spatialized control audio assets can be stored, each one corresponding to a particular control having a pre-deter-mined location, so that when a control is pressed, the spatial audio processor 30 can select the corresponding control asset to generate the driver signals with.

Dynamic Processing of Control Sounds

Figure 3:
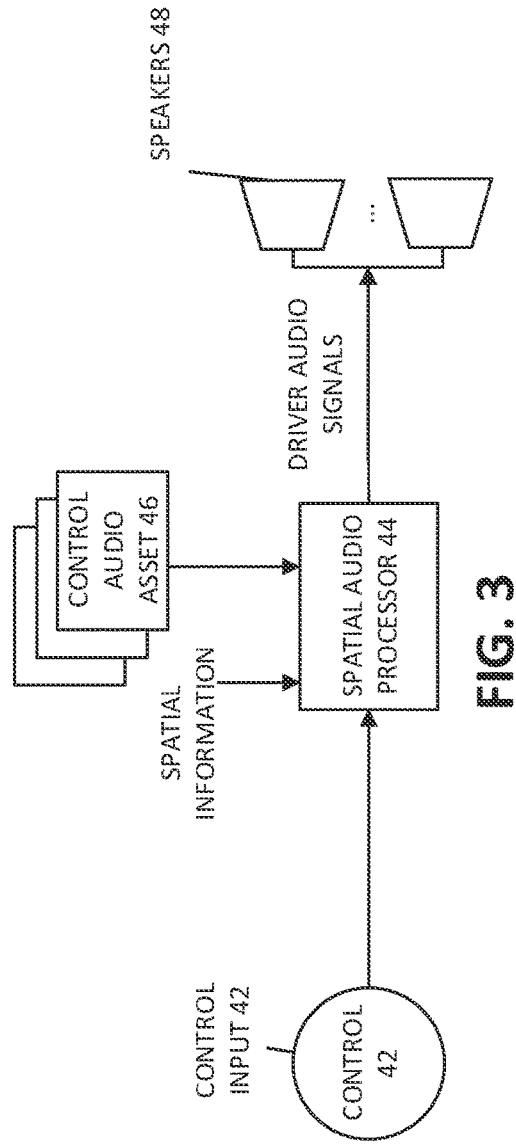

In one aspect, as shown in FIG. 3, the driver signals can be generated in real-time or dynamically, with a spatial renderer in response to the control input 42. It should be understood that in 'real-time' means that the driver signals are generated with minimal delays which can include processing delays, buffering, and communication latency. Control audio assets 46 (e.g., data files that contain encoded sound data relating to a control) and spatial information (e.g., azimuth, elevation, or distance) can be used by the spatial audio processor 44 to generate driver signals having the control sound with the spatial auditory cues. The spatial information and a mapping between the control, the spatial information, and/or the control audio asset can be stored in memory. When a control input is received, the processor can select the spatial information and control audio asset that corresponds to the control. The spatial auditory cues generated from the spatial information, along with the control sound, can provide a rich user experience.

Control Sound, Location, and Movement

In one aspect, the virtual location of the control sound can indicate a physical location of the control. For example, when played to a user, the user can perceive one or more of the azimuth, elevation, or distance coordinates of the virtual location in auditory space as indicating the azimuth, elevation, or distance of the physical button, relative to the user. The virtual location can be the same, or substantially the same as that of the physical location of the control. Although the virtual location of the control sound does not have to exactly match the physical location of the control, it should be understood that if the user cannot correlate the sounds by location, the feedback of the control sound may be confusing. Therefore, at some threshold, a difference between the virtual location and the physical location can be disorienting, however, such a threshold can be determined through routine test or repetition.

Figure 4:
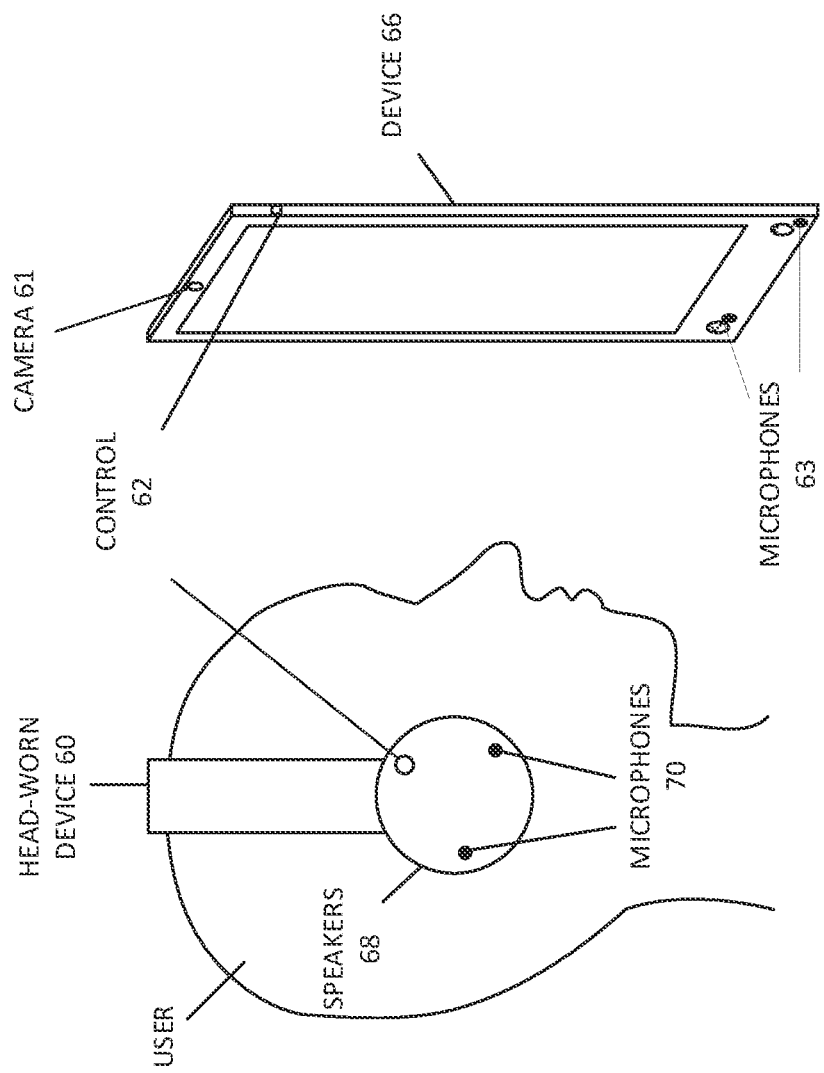
FIG. 4 illustrates a head-worn device, according to one aspect.

In one aspect, as shown in FIG. 4, the control 62 can be located on a head-worn device 60, or on a separate device 66 (e.g., a tablet computer, a mobile phone, or a computer). In the case where the control location relative to the user is not fixed, a means to determine the relative location of the control can be provided. Such a means can include tracking the user, with the device 66, with one or more sensors such as one or more cameras 61 or with microphones 63 (e.g., with triangulation or beamforming). Other techniques can be used for tracking the location of the user relative to the control, as known in the art.

Alternatively or additionally, the control can be integral to the head-worn device 60 and/or have a fixed location relative to the user. Thus, the spatialized control sounds can be predetermined based on where the control is located relative to the user (e.g. is it on a left side of the user's head or a right side of the user's head). In one aspect, the head-worn device 60 can be a head-mounted display (HMD). Controls can be virtual controls in mixed reality, virtual reality, or augmented reality. The head-worn device 60 can include microphones 70 that can be used to provide noise cancellation or allow sounds to actively 'pass' to the user's ears in a transparent mode. Regardless of whether the physical location of the control 62 is varying or fixed, the speakers 68 of the head-worn device can be driven with audio signals having a control sound with a virtual location, the virtual location indicating a physical location of the control 62.

Figure 5:
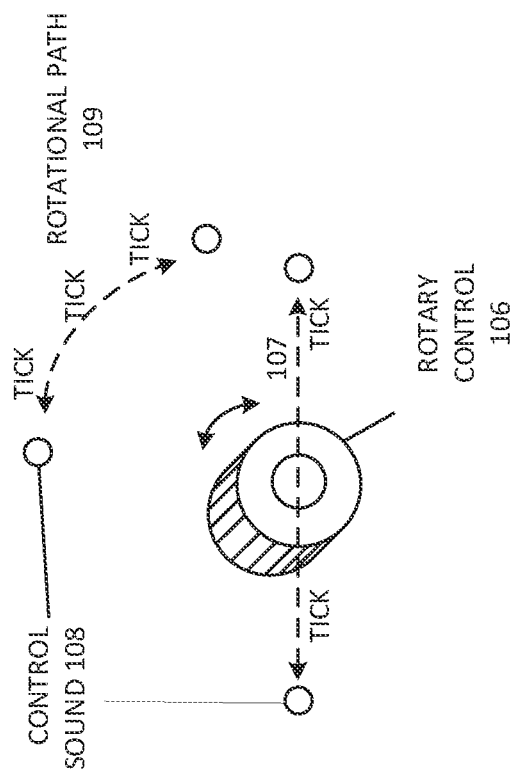
FIG. 5 illustrates a dial or rotary control, according to one aspect.

Movements of the virtual location can indicate behavior of the control based on user inputs. For example, movements can be: from one side to another side, up and down, between near and far, or in a rotational arc, relative to the user. A control sound can be coordinated with changes in the virtual location to simulate a virtual rotation or movement of the control. FIG. 5 shows, in one aspect, the control can be a rotary control 106 that is capable of rotation. The virtual location of a control sound 108 can move along a line 107, for example sweeping back and forth. The axis can be virtualized at or near the control. In one aspect, the control sound can sweep in a rotational path 109, indicating a movement and/or position of the rotary control.

Figure 6:
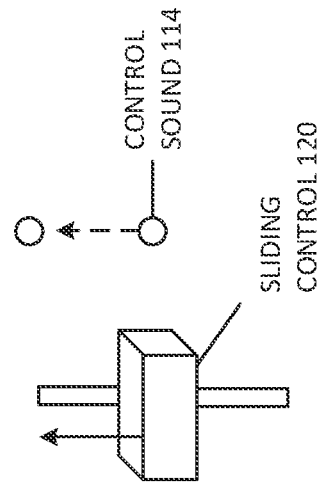
FIG. 6 illustrates a sliding control, according to one aspect.

Similarly, as shown in FIG. 6, a sliding control 120 can have a control sound 114 that moves (e.g. up and down, back and forth, or near and far) based on the manipulation of the sliding control 120. Movements of the control sound, which are implemented through spatial auditory cues, can be synchronized with the manipulation of the respective controls. In one aspect, the control sound can include interval sounds. Intervals (e.g., every 5 degrees of a rotary control, or every millimeter of travel of the slider) can be indicated with interval sounds such as ticks, clicks, beeps, or other sounds. These interval sounds can be spatialized. A user can be provided with auditory feedback to gauge how much a value is being changed in response to the control input. Controls can be variable controls such as rotary controls or sliders that can provide a range of states or positions, or controls can be buttons with a press state (e.g., a finger is currently on the button), a pressed state (the button has been pressed), and/or an un-pressed state (the button is not pressed). These examples are illustrative, as controls can take other forms.

Figure 7:
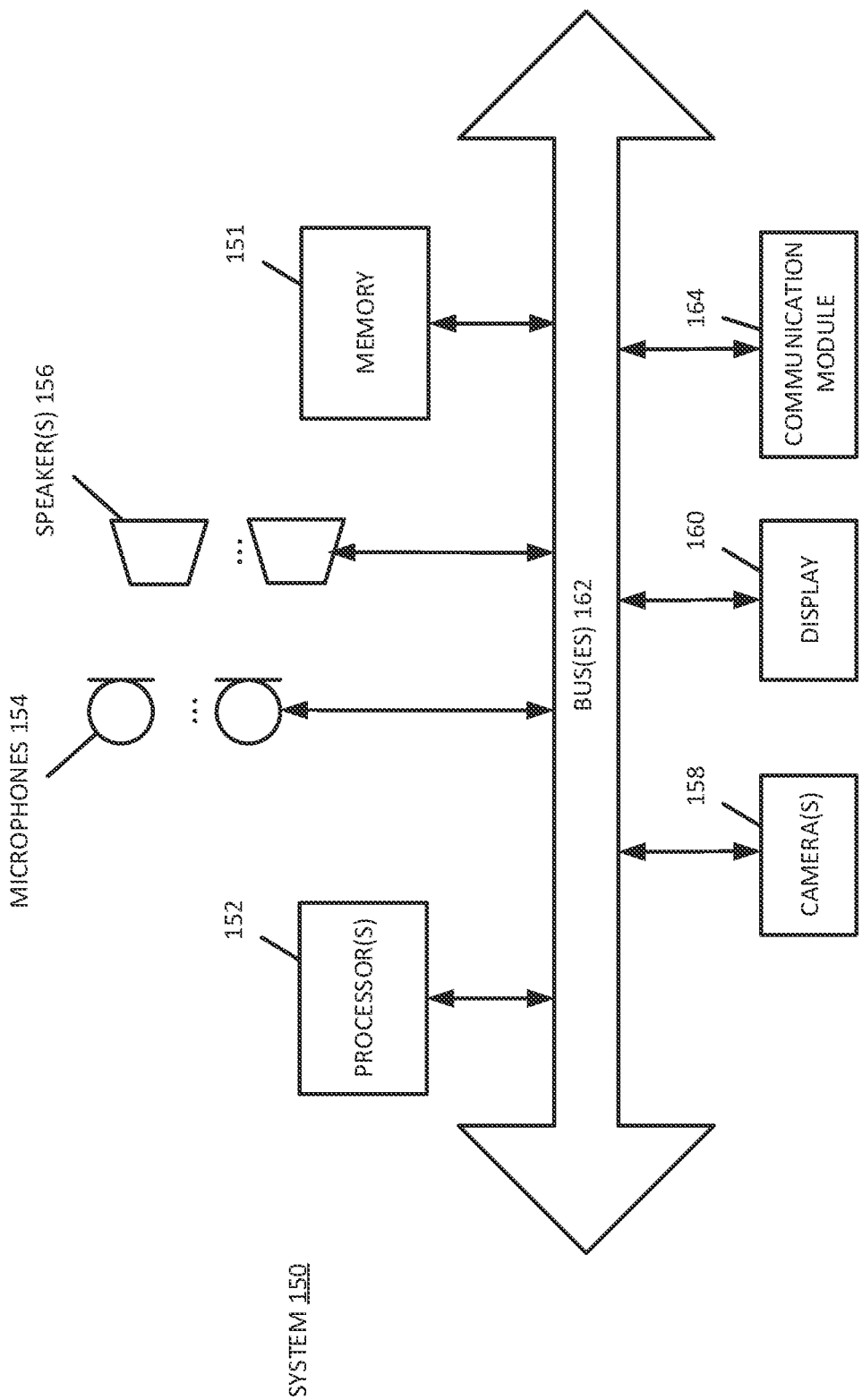
FIG. 7 illustrates an audio system, according to one aspect.

FIG. 7 shows a block diagram for explaining an example of an audio processing system hardware which may be used with any of the aspects described herein. Note that while FIG. 7 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 7 is not intended to represent any particular architecture or manner of interconnecting the components as such details are not germane to the aspects herein. It will also be appreciated that other types of audio processing systems that have fewer components than shown or more components than shown in FIG. 7 can also be used. For example, some operations of the process may be performed by electronic circuitry that is within a headset housing while others are performed by electronic circuitry that is within another device that is communication with the headset housing, e.g., a smartphone, an in-vehicle infotainment system, or a remote server. Accordingly, the processes described herein are not limited to use with the hardware and software of FIG. 6.

FIG. 7 is an example implementation of the audio systems and methods described above in connection with FIGS. 1-6, that have a programed processor 152. The components shown may be integrated within a housing, such as that of a smart phone, a smart speaker, or a head-worn speakers. These include microphones 154 which may have a fixed geometrical relationship to each other (and are therefore treated as a microphone array.) The audio system 150 can include speakers 156, e.g., ear-worn speakers.

The microphone signals may be provided to the processor 152 and to a memory 151 (for example, solid state non-volatile memory) for storage, in digital, discrete time format, by an audio codec. The processor 152 may also communicate with external devices via a communication module 164, for example, to communicate over the internet. The processor 152 is can be a single processor or a plurality of processors.

The memory 151 has stored therein instructions that when executed by the processor 152 perform the audio processes described herein. Note also, that the modules described in FIG. 1 (for example, spatial audio processor 16) can be performed by processor 208 through instructions stored on the memory 210. Note that some of these circuit components, and their associated digital signal processes, may be alternatively implemented by hardwired logic circuits (for example, dedicated digital filter blocks, hardwired state machines.) The system can include one or more cameras 158, and/or a display 160 (e.g., a head mounted display).

Various aspects descried herein may be embodied, at least in part, in software. That is, the techniques may be carried out in an audio processing system in response to its processor executing a sequence of instructions contained in a storage medium, such as a non-transitory machine-readable storage medium (for example DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "processor", "separator", "renderer", "estimator", "processor", "calculator", "combiner", "synthesizer", "component," "unit," "module," and "logic" are representative of hardware and/or software configured to perform one or more functions. For instance, examples of "hardware" include, but are not limited or restricted to an integrated circuit such as a processor (for example, a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (for example, an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method for providing audio feedback, comprising:
receiving a control input of a control; and
in response to the control input, driving ear-worn speakers with a first driver signal and a second driver signal,
wherein the first driver signal and the second driver signal include a control sound having a virtual location of the control that has a same perceived distance from at least one ear-worn speaker as a physical location of the control from the at least one ear-worn speaker.

2. The method of claim 1, wherein the control is located on a remote device relative to the ear-worn speakers.

3. The method of claim 1, wherein the control is located on a head-worn device that houses the ear-worn speakers.

4. The method of claim 1, wherein the control sound indicates a behavior of the control as a result of the control input.

5. The method of claim 4, wherein the control is a rotary control and the behavior comprises a rotational movement of the control sound with a rotational direction that is the same as a physical rotation of the rotary control.

6. The method of claim 4, wherein the control includes a push button and the behavior comprises a button click at the same location as the control.

7. The method of claim 4, wherein the control includes a slider and the behavior comprises a sweeping movement of the control sound.

8. The method of claim 1, wherein the control sound comprises one or more words.

9. The method of claim 1, wherein the control is a mechanical control.

10. The method of claim 1, wherein the control is rendered on a display.

11. A system, comprising
a first speaker and a second speaker, the first speaker and the second speaker being ear-worn speakers;
a control; and
a processor, configured to perform the following:
receive a control input of the control, and
in response to the control input, drive the ear-worn speakers with a first driver signal and second driver signal, wherein the first driver signal and the second driver signal include a control sound having a virtual location of the control that has a same perceived distance from at least one ear-worn speaker as a physical location of the control from the at least one ear-worn speaker.

12. The system of claim 11, wherein the control is located on a remote device relative to the ear-worn speakers.

13. The system of claim 11, wherein the control is located on a head-worn device that houses the ear-worn speakers.

14. The system of claim 11, wherein the control sound indicates a behavior of the control as a result of the control input.

15. The system of claim 11, wherein the control is a rotary control and a behavior comprises a rotational movement of the control sound with a rotational direction that is the same as a physical rotation of the rotary control.

16. A non-transitory machine readable medium having stored therein instructions that, when executed by a processor causes the processor to:
receive a control input of a control; and
in response to the control input, drive ear-worn speakers with a first driver signal and second driver signal,
wherein the first driver signal and the second driver signal include a control sound having a virtual location of the control that has a same perceived distance from at least one ear-worn speaker as a physical location of the control from the at least one ear-worn speaker.

17. The non-transitory machine readable medium of claim 16, wherein the control sound comprises one or more words.

18. The non-transitory machine readable medium of claim 16, wherein the control is a mechanical control.

19. The non-transitory machine readable medium of claim 16, wherein the control is rendered on a display.

20. The non-transitory machine readable medium of claim 16, wherein the control sound indicates a behavior of the control as a result of the control input.

* * * * *